United States Patent
Kale

(10) Patent No.: US 12,547,881 B2
(45) Date of Patent: Feb. 10, 2026

(54) DEEP LEARNING ACCELERATOR IN MEMORY UTILIZED IN FACTORY SAFETY MONITORING SYSTEMS

(71) Applicant: Micron Technology, Inc., Boise, ID (US)

(72) Inventor: Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 913 days.

(21) Appl. No.: 17/077,986

(22) Filed: Oct. 22, 2020

(65) Prior Publication Data

US 2022/0129738 A1 Apr. 28, 2022

(51) Int. Cl.
| | | |
|---|---|---|
| G06N 3/06 | (2006.01) | |
| G06N 3/04 | (2023.01) | |
| G06N 3/063 | (2023.01) | |
| G06N 3/08 | (2023.01) | |

(52) U.S. Cl.
CPC .............. *G06N 3/063* (2013.01); *G06N 3/04* (2013.01); *G06N 3/08* (2013.01)

(58) Field of Classification Search
CPC ........ G06N 3/0895; G06N 3/09; G06N 3/091; G06N 3/092; G06N 3/094; G06N 3/096; G06N 3/098; G06N 3/0985; G06N 6/04; G06N 3/0464; G06N 3/0495; G06N 3/0499; G06N 3/08; G06N 3/063; G06N 3/06
See application file for complete search history.

(56) References Cited

U.S. PATENT DOCUMENTS

| | | | |
|---|---|---|---|
| 2019/0019564 A1* | 1/2019 | Li ...................... | G11C 16/0466 |
| 2019/0033851 A1 | 1/2019 | Maurer et al. | |
| 2019/0354080 A1 | 11/2019 | Yoshida et al. | |
| 2019/0384273 A1 | 12/2019 | Han | |
| 2020/0050206 A1* | 2/2020 | Deyle ................ | G05D 1/0231 |
| 2020/0074287 A1* | 3/2020 | Mody .................... | G06N 3/063 |
| 2020/0234143 A1* | 7/2020 | Yoon ..................... | G06N 3/045 |

OTHER PUBLICATIONS

International Search Report and Written Opinion, PCT/US2021/055021, mailed on Feb. 3, 2022.

* cited by examiner

*Primary Examiner* — Paulinho E Smith
(74) *Attorney, Agent, or Firm* — Greenberg Traurig

(57) ABSTRACT

Systems, devices, and methods related to safety monitoring in a factory using an artificial neural network are described. For example, the system can use a plurality of sensors installed at different locations of a factory to generate a plurality of streams of sensor data. At least one memory device can be configured in the system to perform matrix computations of the artificial neural network according to the plurality of streams of sensor data written into at least one memory device. Based on an output of the artificial neural network responsive to the plurality of streams of sensor data, the system generates an event identification representative of a hazard or anomaly in the factory and activates safety control or notification responsive to the event identification.

16 Claims, 11 Drawing Sheets

DEEP LEARNING ACCELERATOR IN MEMORY UTILIZED IN FACTORY SAFETY MONITORING SYSTEMS

TECHNICAL FIELD

At least some embodiments disclosed herein relate to factory safety monitoring systems in general and more particularly, but not limited to, memory with accelerators for matrix computation of Artificial Neural Networks (ANNs) in the factory safety monitoring systems.

BACKGROUND

An Artificial Neural Network (ANN) uses a network of neurons to process inputs to the network and to generate outputs from the network.

Deep learning has been applied to many application fields, such as computer vision, speech/audio recognition, natural language processing, machine translation, bioinformatics, drug design, medical image processing, games, etc.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
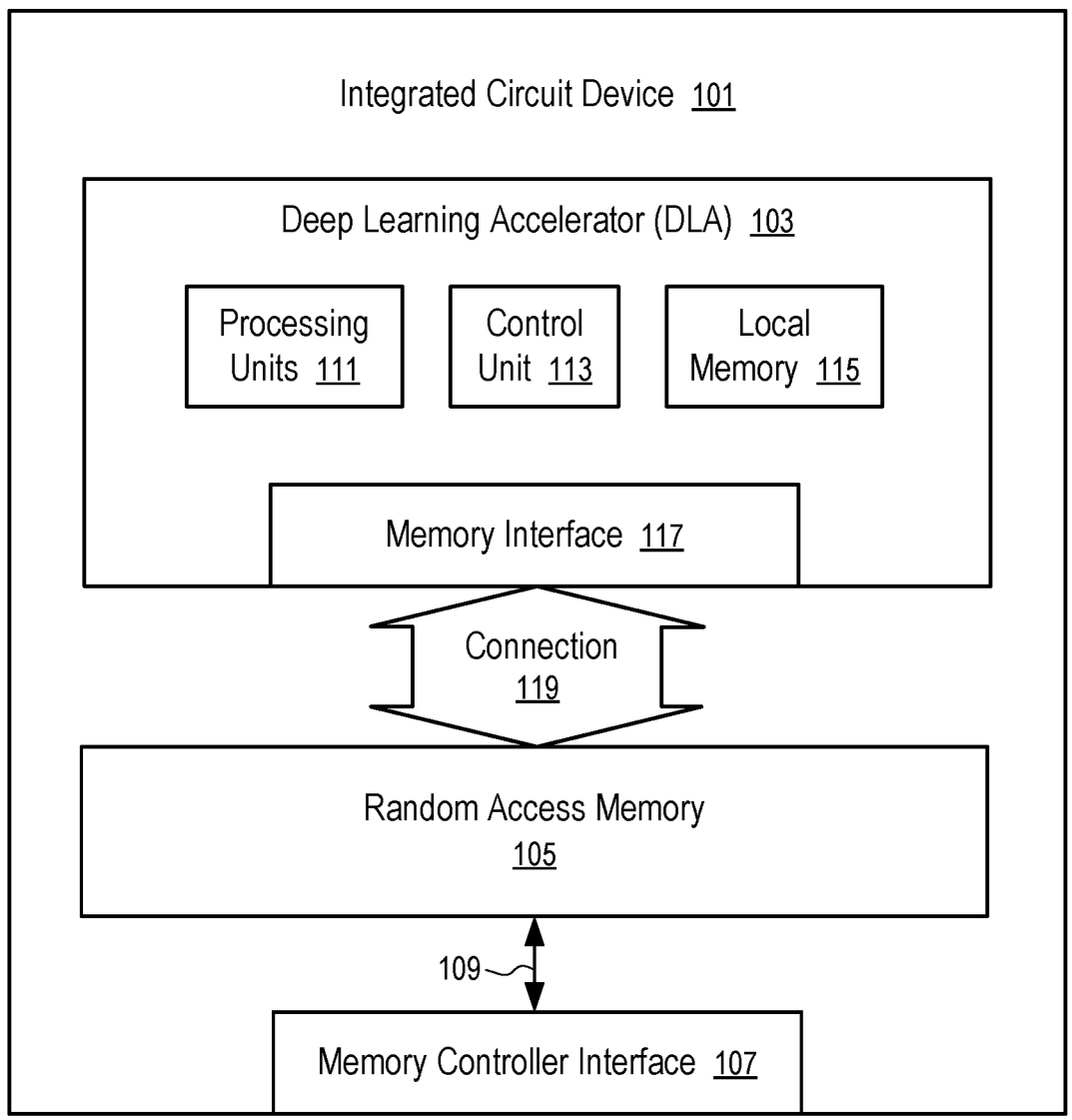
FIG. 1 shows an integrated circuit device having a Deep Learning Accelerator and random access memory configured according to one embodiment.

At least some embodiments disclosed herein provide neuromorphic computing in memory/storage devices utilized in factory safety monitoring systems.

Automated factories can have various sensors configured to gather information relevant to the safe operations of production lines and/or machinery. For example, the chemical sensors, image sensors, infrared sensors, heat sensors, etc. can be installed to monitor the operating states and conditions of various machines and at various locations in a factory. Data collected from various sources in the factory can be analyzed to allow a central safety monitoring system to detect and identify any hazardous conditions and their locations in the factory. In response to the detection of a hazardous condition or a potential hazard at a location in the factory, the central safety monitoring system can take safety measures to alter operations and/or operating conditions to avoid, limit, or reduce damage, disruption, and/or harm.

For example, an Artificial Neural Network (ANN) can be used to fuse and analyze the collected data to generate a diagnosis or classification of an abnormal state or scenario in the factory. The diagnosis or classification can be used by the safety monitoring system to trigger a rapid response to mitigate and/or control the development of hazardous conditions and to generate notifications, alerts and/or warnings to operators and managers in the factory.

The sensors installed in the factory can generate a large amount of data at separate locations in the factory. The Artificial Neural Network (ANN) can be partitioned into portions such that the computations of the portions of the Artificial Neural Network (ANN) can be processed locally near or at the locations of the sensors to reduce the amount of data being transmitted to the central safety monitoring system. Further, the computing workload of the Artificial Neural Network (ANN) can be distributed to the various locations in the factory.

Memory/storage devices can be connected to sensors at the sensor locations to store the sensor data at least for a period of time. Further, the memory/storage devices can be configured to perform in-memory neuromorphic computing of the portions of the Artificial Neural Network (ANN) that are most relevant to the respective sensors. Neuromorphic computing implemented in memory/storage devices can offer efficiency in small form factors. Neuromorphic specific models developed for different sensors can run interleaved. Data resulting in unrecognized patterns at the sensors can be collected, stored locally in the memory storage device, and then sent to the central safety monitoring system and/or a remote server for further analyses. Neuromorphic computing capability implemented in the memory/storage devices can also use unsupervised machine learning methods to improve their outputs over time.

For example, such a memory storage device can be configured as an integrated circuit with capability to perform computations of Artificial Neural Networks (ANNs) with reduced energy consumption and computation time. The integrated circuit can include a Deep Learning Accelerator (DLA) and Random Access Memory (RAM). The Deep Learning Accelerator (DLA) includes a set of programmable hardware computing logic that is specialized and/or optimized to perform parallel vector and/or matrix calculations, including but not limited to multiplication and accumulation of vectors and/or matrices.

Further, the Deep Learning Accelerator (DLA) can include one or more Arithmetic-Logic Units (ALUs) to perform arithmetic and bitwise operations on integer binary numbers.

The Deep Learning Accelerator (DLA) is programmable via a set of instructions to perform the computations of an Artificial Neural Network (ANN).

The granularity of the Deep Learning Accelerator (DLA) operating on vectors and matrices corresponds to the largest unit of vectors/matrices that can be operated upon during the execution of one instruction by the Deep Learning Accelerator (DLA). During the execution of the instruction for a predefined operation on vector/matrix operands, elements of vector/matrix operands can be operated upon by the Deep Learning Accelerator (DLA) in parallel to reduce execution time and/or energy consumption associated with memory/data access. The operations on vector/matrix operands of the granularity of the Deep Learning Accelerator (DLA) can be used as building blocks to implement computations on vectors/matrices of larger sizes.

The implementation of a typical/practical Artificial Neural Network (ANN) involves vector/matrix operands having sizes that are larger than the operation granularity of the Deep Learning Accelerator (DLA). To implement such an Artificial Neural Network (ANN) using the Deep Learning Accelerator (DLA), computations involving the vector/matrix operands of large sizes can be broken down to the computations of vector/matrix operands of the granularity of the Deep Learning Accelerator (DLA). The Deep Learning Accelerator (DLA) can be programmed via instructions to carry out the computations involving large vector/matrix operands. For example, atomic computation capabilities of the Deep Learning Accelerator (DLA) in manipulating vectors and matrices of the granularity of the Deep Learning Accelerator (DLA) in response to instructions can be programmed to implement computations in an Artificial Neural Network (ANN).

In some implementations, the Deep Learning Accelerator (DLA) lacks some of the logic operation capabilities of a typical Central Processing Unit (CPU). However, the Deep Learning Accelerator (DLA) can be configured with sufficient logic units to process the input data provided to an Artificial Neural Network (ANN) and generate the output of the Artificial Neural Network (ANN) according to a set of instructions generated for the Deep Learning Accelerator (DLA). Thus, the Deep Learning Accelerator (DLA) can perform the computation of an Artificial Neural Network (ANN) with little or no help from a Central Processing Unit (CPU) or another processor. Optionally, a conventional general purpose processor can also be configured as part of the Deep Learning Accelerator (DLA) to perform operations that cannot be implemented efficiently using the vector/matrix processing units of the Deep Learning Accelerator (DLA), and/or that cannot be performed by the vector/matrix processing units of the Deep Learning Accelerator (DLA).

A typical Artificial Neural Network (ANN) can be described/specified in a standard format (e.g., Open Neural Network Exchange (ONNX)). A compiler can be used to convert the description of the Artificial Neural Network (ANN) into a set of instructions for the Deep Learning Accelerator (DLA) to perform calculations of the Artificial Neural Network (ANN). The compiler can optimize the set of instructions to improve the performance of the Deep Learning Accelerator (DLA) in implementing the Artificial Neural Network (ANN).

For example, each neuron in an Artificial Neural Network (ANN) receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions.

For example, each neuron can generate a weighted sum of its inputs and its bias and then produce an output that is the function of the weighted sum, computed using the activation function of the neuron.

The relations between the input(s) and the output(s) of an ANN in general are defined by an ANN model that includes the data representing the connectivity of the neurons in the network, as well as the bias, activation function, and synaptic weights of each neuron. Based on a given ANN model, a computing device can be configured to compute the output(s) of the network from a given set of inputs to the network.

For example, the inputs to an ANN network may be generated based on camera inputs; and the outputs from the ANN network may be the identification of an item, such as an event or an object.

In general, an ANN may be trained using a supervised method where the parameters in the ANN are adjusted to minimize or reduce the error between known outputs associated with or resulted from respective inputs and computed outputs generated via applying the inputs to the ANN. Examples of supervised learning/training methods include reinforcement learning and learning with error correction.

Alternatively, or in combination, an ANN may be trained using an unsupervised method where the exact outputs resulted from a given set of inputs is not known before the completion of the training. The ANN can be trained to classify an item into a plurality of categories, or data points into clusters.

Multiple training algorithms can be employed for a sophisticated machine learning/training paradigm.

Deep learning uses multiple layers of machine learning to progressively extract features from input data. For example, lower layers can be configured to identify edges in an image; and higher layers can be configured to identify, based on the edges detected using the lower layers, items captured in the image, such as faces, objects, events, etc. Deep learning can be implemented via Artificial Neural Networks (ANNs), such as deep neural networks, deep belief networks, recurrent neural networks, and/or convolutional neural networks.

The Deep Learning Accelerator (DLA) can have local memory, such as registers, buffers and/or caches, configured to store vector/matrix operands and the results of vector/matrix operations. Intermediate results in the registers can be pipelined/shifted in the Deep Learning Accelerator (DLA) as operands for subsequent vector/matrix operations to reduce time and energy consumption in accessing memory/data and thus speed up typical patterns of vector/matrix operations in implementing a typical Artificial Neural Network (ANN). The capacity of registers, buffers and/or caches in the Deep Learning Accelerator (DLA) is typically insufficient to hold the entire data set for implementing the computation of a typical Artificial Neural Network (ANN). Thus, a random access memory coupled to the Deep Learning Accelerator (DLA) is configured to provide an improved data storage capability for implementing a typical Artificial Neural Network (ANN). For example, the Deep Learning Accelerator (DLA) loads data and instructions from the random access memory and stores results back into the random access memory.

The communication bandwidth between the Deep Learning Accelerator (DLA) and the random access memory is configured to optimize or maximize the utilization of the computation power of the Deep Learning Accelerator (DLA). For example, high communication bandwidth can be provided between the Deep Learning Accelerator (DLA) and the random access memory such that vector/matrix operands can be loaded from the random access memory into the Deep Learning Accelerator (DLA) and results stored back into the random access memory in a time period that is approximately equal to the time for the Deep Learning Accelerator (DLA) to perform the computations on the vector/matrix operands. The granularity of the Deep Learning Accelerator (DLA) can be configured to increase the ratio between the amount of computations performed by the Deep Learning Accelerator (DLA) and the size of the vector/matrix operands such that the data access traffic between the Deep Learning Accelerator (DLA) and the random access memory can be reduced, which can reduce the requirement on the communication bandwidth between the Deep Learning Accelerator (DLA) and the random access memory. Thus, the bottleneck in data/memory access can be reduced or eliminated.

FIG. 1 shows an integrated circuit device (101) having a Deep Learning Accelerator (103) and random access memory (105) configured according to one embodiment.

The Deep Learning Accelerator (103) in FIG. 1 includes processing units (111), a control unit (113), and local memory (115). When vector and matrix operands are in the local memory (115), the control unit (113) can use the processing units (111) to perform vector and matrix operations in accordance with instructions. Further, the control unit (113) can load instructions and operands from the random access memory (105) through a memory interface (117) and a high speed/bandwidth connection (119).

The integrated circuit device (101) is configured to be enclosed within an integrated circuit package with pins or contacts for a memory controller interface (107).

The memory controller interface (107) is configured to support a standard memory access protocol such that the integrated circuit device (101) appears to a typical memory controller in a way same as a conventional random access memory device having no Deep Learning Accelerator (DLA) (103). For example, a memory controller external to the integrated circuit device (101) can access, using a standard memory access protocol through the memory controller interface (107), the random access memory (105) in the integrated circuit device (101).

The integrated circuit device (101) is configured with a high bandwidth connection (119) between the random access memory (105) and the Deep Learning Accelerator (DLA) (103) that are enclosed within the integrated circuit device (101). The bandwidth of the connection (119) is higher than the bandwidth of the connection (109) between the random access memory (105) and the memory controller interface (107).

In one embodiment, both the memory controller interface (107) and the memory interface (117) are configured to access the random access memory (105) via a same set of buses or wires. Thus, the bandwidth to access the random access memory (105) is shared between the memory interface (117) and the memory controller interface (107). Alternatively, the memory controller interface (107) and the memory interface (117) are configured to access the random access memory (105) via separate sets of buses or wires. Optionally, the random access memory (105) can include multiple sections that can be accessed concurrently via the connection (119). For example, when the memory interface (117) is accessing a section of the random access memory (105), the memory control interface (107) can concurrently access another section of the random access memory (105). For example, the different sections can be configured on different integrated circuit dies and/or different planes/banks of memory cells; and the different sections can be accessed in parallel to increase throughput in accessing the random access memory (105). For example, the memory controller interface (107) is configured to access one data unit of a predetermined size at a time; and the memory interface (117) is configured to access multiple data units, each of the same predetermined size, at a time.

In one embodiment, the random access memory (105) and the integrated circuit device (101) are configured on different integrated circuit dies configured within a same integrated circuit package. Further, the random access memory (105) can be configured on one or more integrated circuit dies that allows parallel access of multiple data elements concurrently.

In some implementations, the number of data elements of a vector or matrix that can be accessed in parallel over the connection (119) corresponds to the granularity of the Deep Learning Accelerator (DLA) operating on vectors or matrices. For example, when the processing units (111) can operate on a number of vector/matrix elements in parallel, the connection (119) is configured to load or store the same number, or multiples of the number, of elements via the connection (119) in parallel.

Optionally, the data access speed of the connection (119) can be configured based on the processing speed of the Deep Learning Accelerator (DLA) (103). For example, after an amount of data and instructions have been loaded into the local memory (115), the control unit (113) can execute an instruction to operate on the data using the processing units (111) to generate output. Within the time period of processing to generate the output, the access bandwidth of the connection (119) allows the same amount of data and instructions to be loaded into the local memory (115) for the next operation and the same amount of output to be stored back to the random access memory (105). For example, while the control unit (113) is using a portion of the local memory (115) to process data and generate output, the memory interface (117) can offload the output of a prior operation into the random access memory (105) from, and load operand data and instructions into, another portion of the local memory (115). Thus, the utilization and performance of the Deep Learning Accelerator (DLA) are not restricted or reduced by the bandwidth of the connection (119).

The random access memory (105) can be used to store the model data of an Artificial Neural Network (ANN) and to buffer input data for the Artificial Neural Network (ANN). The model data does not change frequently. The model data can include the output generated by a compiler for the Deep Learning Accelerator (DLA) to implement the Artificial Neural Network (ANN). The model data typically includes matrices used in the description of the Artificial Neural Network (ANN) and instructions generated for the Deep Learning Accelerator (DLA) (103) to perform vector/matrix operations of the Artificial Neural Network (ANN) based on vector/matrix operations of the granularity of the Deep Learning Accelerator (DLA) (103). The instructions operate not only on the vector/matrix operations of the Artificial Neural Network (ANN), but also on the input data for the Artificial Neural Network (ANN).

In one embodiment, when the input data is loaded or updated in the random access memory (105), the control unit (113) of the Deep Learning Accelerator (DLA) (103) can automatically execute the instructions for the Artificial Neural Network (ANN) to generate an output of the Artificial Neural Network (ANN). The output is stored into a predefined region in the random access memory (105). The Deep Learning Accelerator (DLA) (103) can execute the instructions without help from a Central Processing Unit (CPU). Thus, communications for the coordination between the Deep Learning Accelerator (DLA) (103) and a processor outside of the integrated circuit device (101) (e.g., a Central Processing Unit (CPU)) can be reduced or eliminated.

Optionally, the logic circuit of the Deep Learning Accelerator (DLA) (103) can be implemented via Complementary Metal Oxide Semiconductor (CMOS). For example, the technique of CMOS Under the Array (CUA) of memory cells of the random access memory (105) can be used to implement the logic circuit of the Deep Learning Accelerator (DLA) (103), including the processing units (111) and the control unit (113). Alternatively, the technique of CMOS in the Array of memory cells of the random access memory (105) can be used to implement the logic circuit of the Deep Learning Accelerator (DLA) (103).

In some implementations, the Deep Learning Accelerator (DLA) (103) and the random access memory (105) can be implemented on separate integrated circuit dies and connected using Through-Silicon Vias (TSV) for increased data bandwidth between the Deep Learning Accelerator (DLA) (103) and the random access memory (105). For example, the Deep Learning Accelerator (DLA) (103) can be formed on an integrated circuit die of a Field-Programmable Gate Array (FPGA) or Application Specific Integrated circuit (ASIC).

Alternatively, the Deep Learning Accelerator (DLA) (103) and the random access memory (105) can be configured in separate integrated circuit packages and connected via multiple point-to-point connections on a printed circuit board (PCB) for parallel communications and thus increased data transfer bandwidth.

The random access memory (105) can be volatile memory or non-volatile memory, or a combination of volatile memory and non-volatile memory. Examples of non-volatile memory include flash memory, memory cells formed based on negative- and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two lays of wires running in perpendicular directions, where wires of one lay run in one direction in the layer that is located above the memory element columns, and wires of the other lay run in another direction and are located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

For example, non-volatile memory can be configured to implement at least a portion of the random access memory (105). The non-volatile memory in the random access memory (105) can be used to store the model data of an Artificial Neural Network (ANN). Thus, after the integrated circuit device (101) is powered off and restarts, it is not necessary to reload the model data of the Artificial Neural Network (ANN) into the integrated circuit device (101). Further, the non-volatile memory can be programmable/rewritable. Thus, the model data of the Artificial Neural Network (ANN) in the integrated circuit device (101) can be updated or replaced to implement an update Artificial Neural Network (ANN), or another Artificial Neural Network (ANN).

The processing units (111) of the Deep Learning Accelerator (DLA) (103) can include vector-vector units, matrix-vector units, and/or matrix-matrix units. Examples of units configured to perform for vector-vector operations, matrix-vector operations, and matrix-matrix operations are discussed below in connection with FIGS. 2-4.

Figure 2:
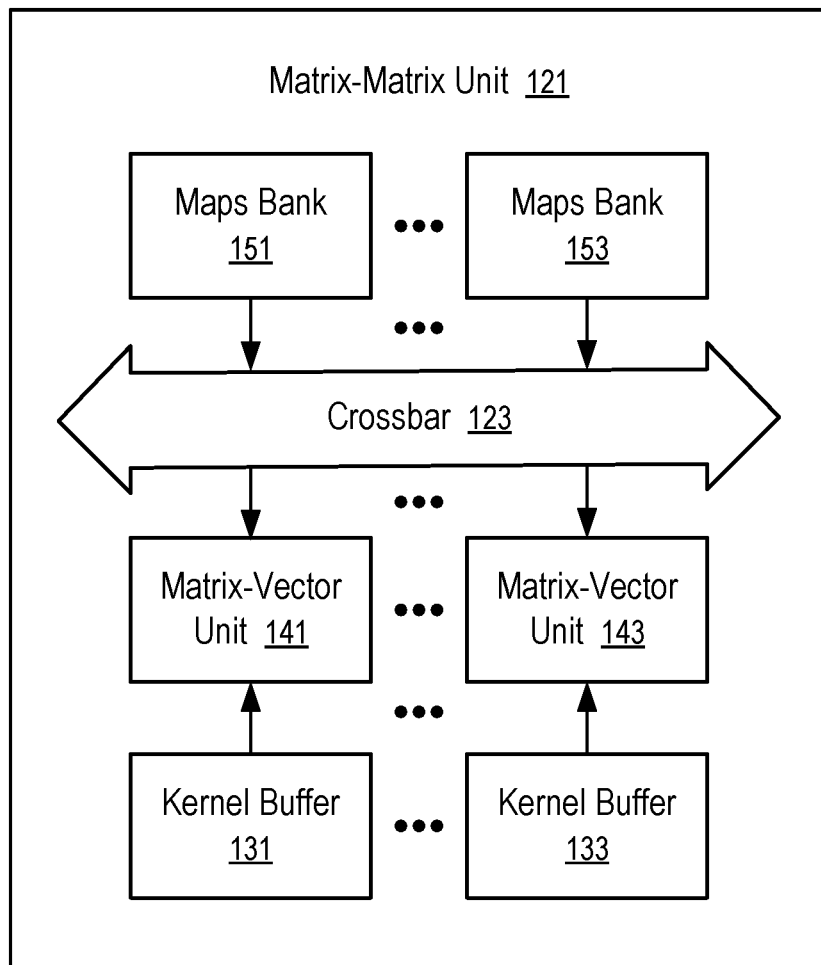
FIG. 2 shows a processing unit configured to perform matrix-matrix operations according to one embodiment.

FIG. 2 shows a processing unit configured to perform matrix-matrix operations according to one embodiment. For example, the matrix-matrix unit (121) of FIG. 2 can be used as one of the processing units (111) of the Deep Learning Accelerator (DLA) (103) of FIG. 1.

In FIG. 2, the matrix-matrix unit (121) includes multiple kernel buffers (131 to 133) and multiple the maps banks (151 to 153). Each of the maps banks (151 to 153) stores one vector of a matrix operand that has multiple vectors stored in the maps banks (151 to 153) respectively; and each of the kernel buffers (131 to 133) stores one vector of another matrix operand that has multiple vectors stored in the kernel buffers (131 to 133) respectively. The matrix-matrix unit (121) is configured to perform multiplication and accumulation operations on the elements of the two matrix operands, using multiple matrix-vector units (141 to 143) that operate in parallel.

A crossbar (123) connects the maps banks (151 to 153) to the matrix-vector units (141 to 143). The same matrix operand stored in the maps bank (151 to 153) is provided via the crossbar (123) to each of the matrix-vector units (141 to 143); and the matrix-vector units (141 to 143) receives data elements from the maps banks (151 to 153) in parallel. Each of the kernel buffers (131 to 133) is connected to a respective one in the matrix-vector units (141 to 143) and provides a vector operand to the respective matrix-vector unit. The matrix-vector units (141 to 143) operate concurrently to compute the operation of the same matrix operand, stored in the maps banks (151 to 153) multiplied by the corresponding vectors stored in the kernel buffers (131 to 133). For example, the matrix-vector unit (141) performs the multiplication operation on the matrix operand stored in the maps banks (151 to 153) and the vector operand stored in the kernel buffer (131), while the matrix-vector unit (143) is concurrently performing the multiplication operation on the matrix operand stored in the maps banks (151 to 153) and the vector operand stored in the kernel buffer (133).

Figure 3:
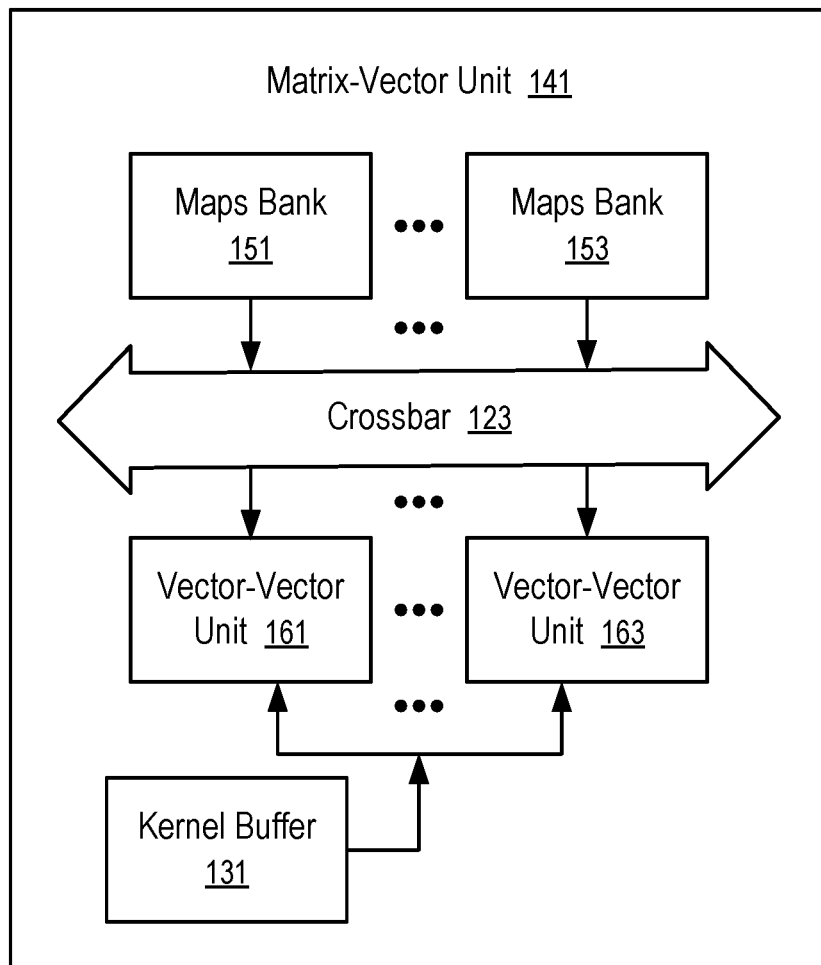
FIG. 3 shows a processing unit configured to perform matrix-vector operations according to one embodiment.

Each of the matrix-vector units (141 to 143) in FIG. 2 can be implemented in a way as illustrated in FIG. 3.

FIG. 3 shows a processing unit configured to perform matrix-vector operations according to one embodiment. For example, the matrix-vector unit (141) of FIG. 3 can be used as any of the matrix-vector units in the matrix-matrix unit (121) of FIG. 2.

In FIG. 3, each of the maps banks (151 to 153) stores one vector of a matrix operand that has multiple vectors stored in the maps banks (151 to 153) respectively, in a way similar to the maps banks (151 to 153) of FIG. 2. The crossbar (123) in FIG. 3 provides the vectors from the maps banks (151) to the vector-vector units (161 to 163) respectively. A same vector stored in the kernel buffer (131) is provided to the vector-vector units (161 to 163).

The vector-vector units (161 to 163) operate concurrently to compute the operation of the corresponding vector operands, stored in the maps banks (151 to 153) respectively, multiplied by the same vector operand that is stored in the kernel buffer (131). For example, the vector-vector unit (161) performs the multiplication operation on the vector operand stored in the maps bank (151) and the vector operand stored in the kernel buffer (131), while the vector-vector unit (163) is concurrently performing the multiplication operation on the vector operand stored in the maps bank (153) and the vector operand stored in the kernel buffer (131).

When the matrix-vector unit (141) of FIG. 3 is implemented in a matrix-matrix unit (121) of FIG. 2, the matrix-vector unit (141) can use the maps banks (151 to 153), the crossbar (123) and the kernel buffer (131) of the matrix-matrix unit (121).

Figure 4:
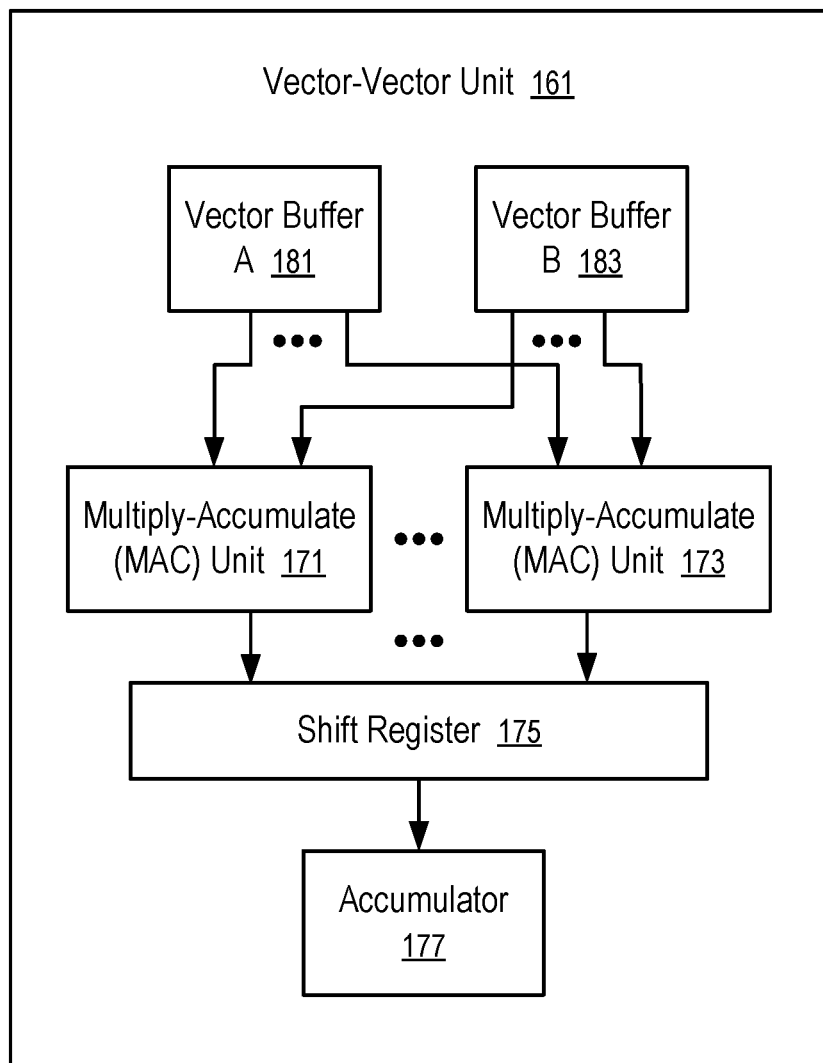
FIG. 4 shows a processing unit configured to perform vector-vector operations according to one embodiment.

Each of the vector-vector units (161 to 163) in FIG. 3 can be implemented in a way as illustrated in FIG. 4.

FIG. 4 shows a processing unit configured to perform vector-vector operations according to one embodiment. For example, the vector-vector unit (161) of FIG. 4 can be used as any of the vector-vector units in the matrix-vector unit (141) of FIG. 3.

In FIG. 4, the vector-vector unit (161) has multiple multiply-accumulate units (171 to 173). Each of the multiply-accumulate units (171 to 173) can receive two numbers as operands, perform multiplication of the two numbers, and add the result of the multiplication to a sum maintained in the multiply-accumulate (MAC) unit.

Each of the vector buffers (181 and 183) stores a list of numbers. A pair of numbers, each from one of the vector buffers (181 and 183), can be provided to each of the multiply-accumulate units (e.g., 173) as input. The multiply-accumulate units (171 to 173) can receive multiple pairs of numbers from the vector buffers (181 and 183) in parallel and perform the multiply-accumulate (MAC) operations in parallel. The outputs from the multiply-accumulate units (171 to 173) are stored into the shift register (175); and an accumulator (177) computes the sum of the results in the shift register (175).

When the vector-vector unit (161) of FIG. 4 is implemented in a matrix-vector unit (141) of FIG. 3, the vector-vector unit (161) can use a maps bank (e.g., 151 or 153) as one vector buffer (181), and the kernel buffer (131) of the matrix-vector unit (141) as another vector buffer (183).

The vector buffers (181 and 183) can have a same length to store the same number/count of data elements. The length can be equal to, or the multiple of, the count of multiply-accumulate units (171 to 173) in the vector-vector unit (161). When the length of the vector buffers (181 and 183) is the multiple of the count of multiply-accumulate units (171 to 173), a number of pairs of inputs, equal to the count of the multiply-accumulate units (171 to 173), can be provided from the vector buffers (181 and 183) as inputs to the multiply-accumulate units (171 to 173) in each iteration; and the vector buffers (181 and 183) feed their elements into the multiply-accumulate units (171 to 173) through multiple iterations.

In one embodiment, the communication bandwidth of the connection (119) between the Deep Learning Accelerator (DLA) (103) and the random access memory (105) is sufficient for the matrix-matrix unit (121) to use portions of the random access memory (105) as the maps banks (151 to 153) and the kernel buffers (131 to 133).

In another embodiment, the maps banks (151 to 153) and the kernel buffers (131 to 133) are implemented in a portion of the local memory (115) of the Deep Learning Accelerator (DLA) (103). The communication bandwidth of the connection (119) between the Deep Learning Accelerator (DLA) (103) and the random access memory (105) is sufficient to load, into another portion of the local memory (115), matrix operands of the next operation cycle of the matrix-matrix unit (121), while the matrix-matrix unit (121) is performing the computation in the current operation cycle using the maps banks (151 to 153) and the kernel buffers (131 to 133) implemented in a different portion of the local memory (115) of the Deep Learning Accelerator (DLA) (103).

Figure 5:
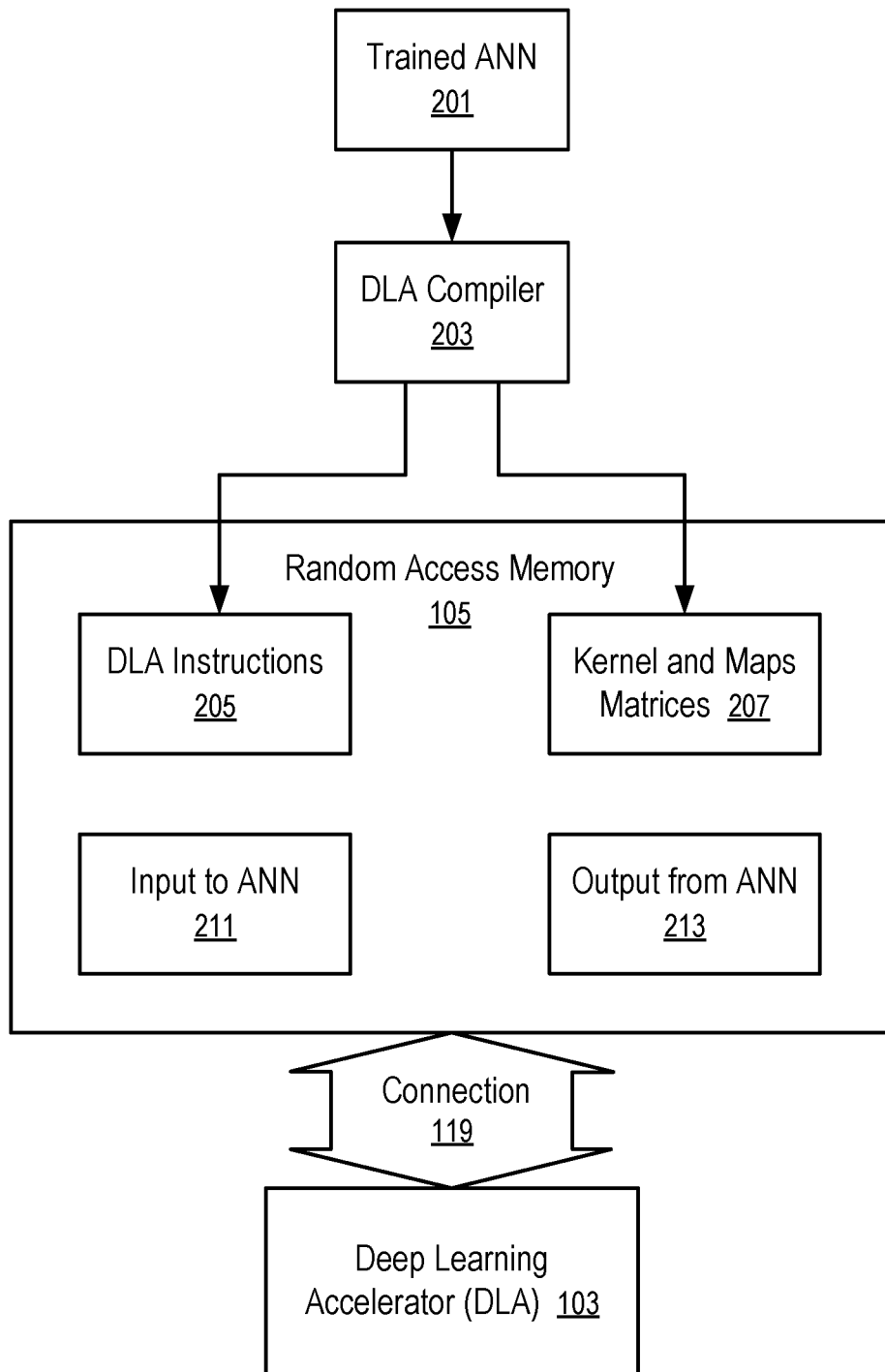
FIG. 5 shows a Deep Learning Accelerator and random access memory configured to autonomously apply inputs to a trained Artificial Neural Network according to one embodiment.

FIG. 5 shows a Deep Learning Accelerator and random access memory configured to autonomously apply inputs to a trained Artificial Neural Network according to one embodiment.

An Artificial Neural Network (201) that has been trained through machine learning (e.g., deep learning) can be described in a standard format (e.g., Open Neural Network Exchange (ONNX)). The description of the trained Artificial Neural Network (201) in the standard format identifies the properties of the artificial neurons and their connectivity.

In FIG. 5, a Deep Learning Accelerator (DLA) compiler (203) converts trained Artificial Neural Network (201) by generating instructions (205) for a Deep Learning Accelerator (DLA) (103) and matrices (207) corresponding to the properties of the artificial neurons and their connectivity. The instructions (205) and the matrices (207) generated by the DLA compiler (203) from the trained Artificial Neural Network (201) can be stored in random access memory (105) for the Deep Learning Accelerator (DLA) (103).

For example, the random access memory (105) and the Deep Learning Accelerator (DLA) (103) can be connected via a high bandwidth connection (119) in a way as in the integrated circuit device (101) of FIG. 1. The autonomous computation of FIG. 5 based on the instructions (205) and the matrices (207) can be implemented in the integrated circuit device (101) of FIG. 1. Alternatively, the random access memory (105) and the Deep Learning Accelerator (DLA) (103) can be configured on a printed circuit board with multiple point to point serial buses running in parallel to implement the connection (119).

In FIG. 5, after the results of the DLA compiler (203) are stored in the random access memory (105), the application of the trained Artificial Neural Network (201) to process an input (211) to the trained Artificial Neural Network (201) to generate the corresponding output (213) of the trained Artificial Neural Network (201) can be triggered by the presence of the input (211) in the random access memory (105), or another indication provided in the random access memory (105).

In response, the Deep Learning Accelerator (DLA) (103) executes the instructions (205) to combine the input (211) and the matrices (207). The execution of the instructions (205) can include the generation of maps matrices for the maps banks (151 to 153) of one or more matrix-matrix units (e.g., 121) of the Deep Learning Accelerator (DLA) (103).

In some embodiments, the inputs (211) to the Artificial Neural Network (201) is in the form of an initial maps matrix. Portions of the initial maps matrix can be retrieved from the random access memory (105) as the matrix operand stored in the maps banks (151 to 153) of a matrix-matrix unit (121). Alternatively, the DLA instructions (205) also include instructions for the Deep Learning Accelerator (DLA) (103) to generate the initial maps matrix from the input (211).

According to the DLA instructions (205), the Deep Learning Accelerator (DLA) (103) loads matrix operands into the kernel buffers (131 to 133) and maps banks (151 to 153) of its matrix-matrix unit (121). The matrix-matrix unit (121) performs the matrix computation on the matrix operands. For example, the DLA instructions (205) break down matrix computations of the trained Artificial Neural Network (201) according to the computation granularity of the Deep Learning Accelerator (DLA) (103) (e.g., the sizes/dimensions of matrices that loaded as matrix operands in the matrix-matrix unit (121)) and applies the input feature maps to the kernel of a layer of artificial neurons to generate output as the input for the next layer of artificial neurons.

Upon completion of the computation of the trained Artificial Neural Network (201) performed according to the instructions (205), the Deep Learning Accelerator (DLA) (103) stores the output (213) of the Artificial Neural Network (201) at a predefined location in the random access memory (105), or at a location specified in an indication provided in the random access memory (105) to trigger the computation.

When the technique of FIG. 5 is implemented in the integrated circuit device (101) of FIG. 1, an external device connected to the memory controller interface (107) can write the input (211) into the random access memory (105) and trigger the autonomous computation of applying the input (211) to the trained Artificial Neural Network (201) by the Deep Learning Accelerator (DLA) (103). After a period of time, the output (213) is available in the random access memory (105); and the external device can read the output (213) via the memory controller interface (107) of the integrated circuit device (101).

For example, a predefined location in the random access memory (105) can be configured to store an indication to trigger the autonomous execution of the instructions (205) by the Deep Learning Accelerator (DLA) (103). The indication can optionally include a location of the input (211) within the random access memory (105). Thus, during the autonomous execution of the instructions (205) to process the input (211), the external device can retrieve the output generated during a previous run of the instructions (205), and/or store another set of input for the next run of the instructions (205).

Optionally, a further predefined location in the random access memory (105) can be configured to store an indication of the progress status of the current run of the instructions (205). Further, the indication can include a prediction of the completion time of the current run of the instructions (205) (e.g., estimated based on a prior run of the instructions (205)). Thus, the external device can check the completion status at a suitable time window to retrieve the output (213).

In some embodiments, the random access memory (105) is configured with sufficient capacity to store multiple sets of inputs (e.g., 211) and outputs (e.g., 213). Each set can be configured in a predetermined slot/area in the random access memory (105).

The Deep Learning Accelerator (DLA) (103) can execute the instructions (205) autonomously to generate the output (213) from the input (211) according to matrices (207) stored in the random access memory (105) without helps from a processor or device that is located outside of the integrated circuit device (101).

In a method according to one embodiment, random access memory (105) of a computing device can be accessed using an interface (107) of the computing device to a memory controller. The computing device can have processing units (e.g., 111) configured to perform at least computations on matrix operands, such as a matrix operand stored in maps banks (151 to 153) and a matrix operand stored in kernel buffers (131 to 133).

For example, the computing device can be enclosed within an integrated circuit package; and a set of connections can connect the interface (107) to the memory controller that is located outside of the integrated circuit package.

Instructions (205) executable by the processing units (e.g., 111) can be written into the random access memory (105) through the interface (107).

Matrices (207) of an Artificial Neural Network (201) can be written into the random access memory (105) through the interface (107). The matrices (207) identify the property and/or state of the Artificial Neural Network (201).

Optionally, at least a portion of the random access memory (105) is non-volatile and configured to store the instructions (205) and the matrices (07) of the Artificial Neural Network (201).

First input (211) to the Artificial Neural Network can be written into the random access memory (105) through the interface (107).

An indication is provided in the random access memory (105) to cause the processing units (111) to start execution of the instructions (205). In response to the indication, the processing units (111) execute the instructions to combine the first input (211) with the matrices (207) of the Artificial Neural Network (201) to generate first output (213) from the Artificial Neural Network (201) and store the first output (213) in the random access memory (105).

For example, the indication can be an address of the first input (211) in the random access memory (105); and the indication can be stored a predetermined location in the random access memory (105) to cause the initiation of the execution of the instructions (205) for the input (211) identified by the address. Optionally, the indication can also include an address for storing the output (213).

The first output (213) can be read, through the interface (107), from the random access memory (105).

For example, the computing device can have a Deep Learning Accelerator (103) formed on a first integrated circuit die and the random access memory (105) formed on one or more second integrated circuit dies. The connection (119) between the first integrated circuit die and the one or more second integrated circuit dies can include Through-Silicon Vias (TSVs) to provide high bandwidth for memory access.

For example, a description of the Artificial Neural Network (201) can be converted using a compiler (203) into the instructions (205) and the matrices (207). The combination of the instructions (205) and the matrices (207) stored in the random access memory (105) and the Deep Learning Accelerator (103) provides an autonomous implementation of the Artificial Neural Network (201) that can automatically convert input (211) to the Artificial Neural Network (201) to its output (213).

For example, during a time period in which the Deep Learning Accelerator (103) executes the instructions (205) to generate the first output (213) from the first input (211) according to the matrices (207) of the Artificial Neural Network (201), the second input to Artificial Neural Network (201) can be written into the random access memory (105) through the interface (107) at an alternative location. After the first output (213) is stored in the random access memory (105), an indication can be provided in the random access memory to cause the Deep Learning Accelerator (103) to again start the execution of the instructions and generate second output from the second input.

During the time period in which the Deep Learning Accelerator (103) executes the instructions (205) to generate the second output from the second input according to the matrices (207) of the Artificial Neural Network (201), the first output (213) can be read from the random access memory (105) through the interface (107); and a further input can be written into the random access memory to replace the first input (211), or written at a different location. The process can be repeated for a sequence of inputs.

The Deep Learning Accelerator (103) can include at least one matrix-matrix unit (121) that can execute an instruction on two matrix operands. The two matrix operands can be a first matrix and a second matrix. Each of two matrices has a plurality of vectors. The matrix-matrix unit (121) can include a plurality of matrix-vector units (141 to 143) configured to operate in parallel. Each of the matrix-vector units (141 to 143) are configured to operate, in parallel with other matrix-vector units, on the first matrix and one vector from second matrix. Further, each of the matrix-vector units (141 to 143) can have a plurality of vector-vector units (161 to 163) configured to operate in parallel. Each of the vector-vector units (161 to 163) is configured to operate, in parallel with other vector-vector units, on a vector from the first matrix and a common vector operand of the corresponding matrix-vector unit. Further, each of the vector-vector units (161 to 163) can have a plurality of multiply-accumulate units (171 to 173) configured to operate in parallel.

The Deep Learning Accelerator (103) can have local memory (115) and a control unit (113) in addition to the processing units (111). The control unit (113) can load instructions (205) and matrix operands from the random access memory (105) for execution by the processing units (111). The local memory can cache matrix operands used by the matrix-matrix unit. The connection (119) can be configured with a bandwidth sufficient to load a set of matrix operands from the random access memory (105) to the local memory (115) during a time period in which the matrix-matrix unit performs operations on two other matrix operands. Further, during the time period, the bandwidth is sufficient to store a result, generated by the matrix-matrix unit (121) in a prior instruction execution, from the local memory (115) to the random access memory (105).

In at least some embodiments, multiply-accumulate units (e.g., 171 to 173) can be implemented using memristor crossbar arrays to perform in-memory neuromorphic computing.

Resistive Random-Access Memory (ReRAM or RRAM) works by changing the resistance across a dielectric solid-state material, which can be referred to as a memristor. In general, a memristor is a two-terminal electrical component that has a non-constant electrical resistance. Its resistance can change based on the history of current flowing through the memristor and/or the history of voltage applied on the memristor. The memristor can remember its recent resistance when the power supply to the memristor is turned off. Thus, the memristor can be used to implement non-volatile memory.

Figure 6:
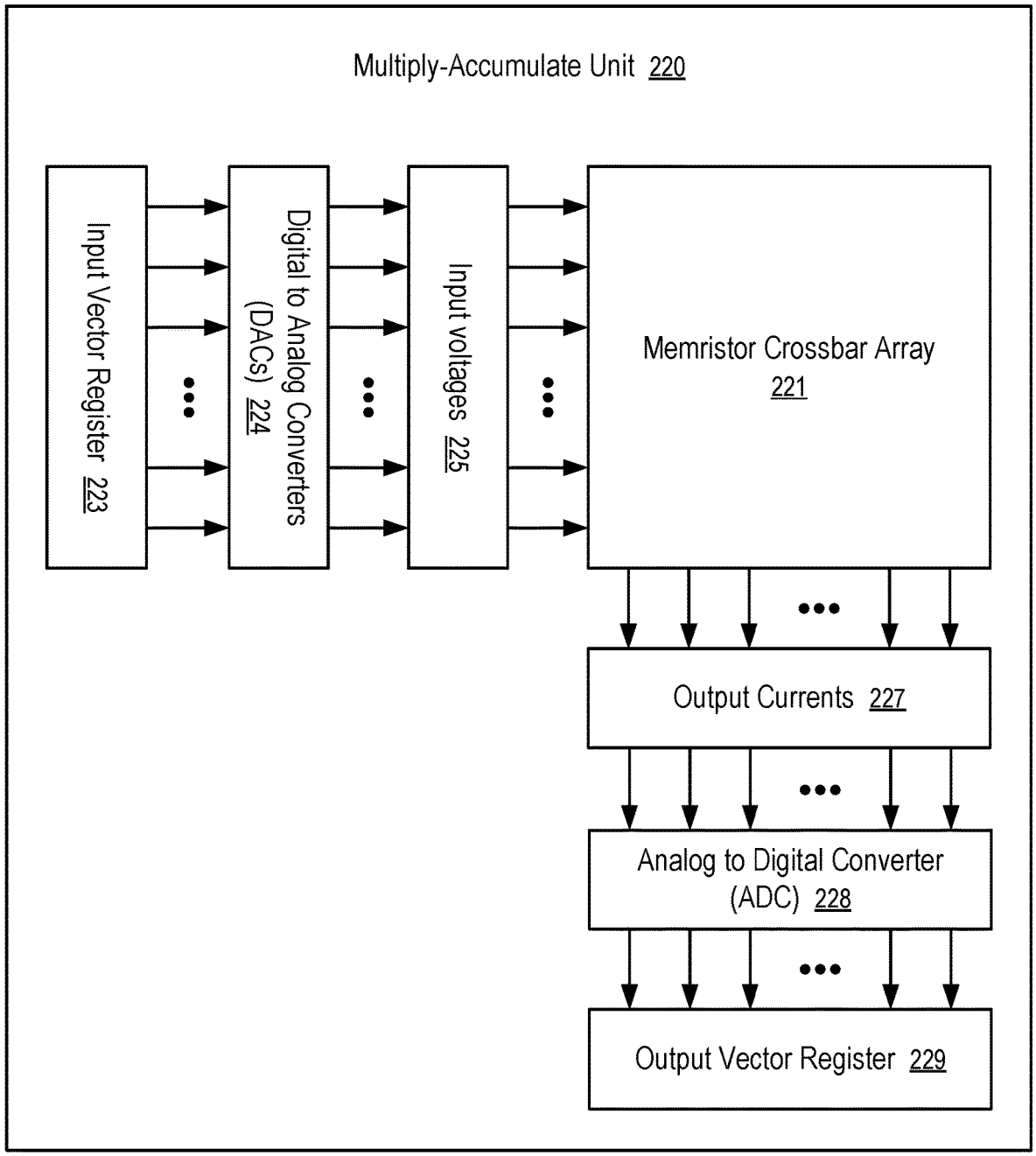
FIG. 6 shows a multiply-accumulate unit implemented using memristors for neuromorphic computing according to one embodiment.

A memristor crossbar array can be used to perform in-memory multiply-accumulate calculations, as illustrated in FIG. 6.

FIG. 6 shows a multiply-accumulate unit implemented using memristors for neuromorphic computing according to one embodiment.

In FIG. 6, a multiply-accumulate unit (220) has a crossbar array (221) of memristors configured to perform Multiply-Accumulate (MAC) calculations in an analog form. Memristors in the crossbar array (221) are connected between wordlines and bitlines of the array (221). The memristors store data representative of a matrix, where the resistance of each memristor corresponds to an element in the matrix.

The elements of an input vector stored in the input vector register (223) can be converted by set of Digital to Analog Converters (224) into input voltages (225). The input voltages (225) are applied on the wordlines of the memristor crossbar array (221).

Electric currents going through the wordlines and a set of memristors in the crossbar array (221) to a bitline are summed in the bitline, which corresponds to accumulation operations. The electric currents correspond to the multiplication of the voltages applied on the wordlines and values associated with the resistances of the memristors, which corresponds to multiplication operations.

The output currents (227) in the bitlines of the memristor crossbar array (221) can be measured using a set of Analog to Digital Converters (228). The output of the Analog to Digital Converters (228) is stored in the output vector register (229). The output vector stored in the output vector register (229) corresponds to the result of multiplying the matrix stored in the memristor crossbar array (221) with the input vector stored in the input vector register (223).

Thus, the multiply-accumulate calculations of a matrix multiplied by a vector can be performed in the same process of reading the matrix stored in the memristors in the crossbar array (221).

The multiply-accumulate unit (220) of FIG. 6 can be used to implement the matrix-vector units (141, . . . , 143) in the matrix-matrix unit (121) of FIG. 2. For example, the matrix stored in the kernel buffers (131, . . . , 133) can be store into the memristor crossbar array (221); and a vector from a maps bank (e.g., 151, . . . , or 153) can be loaded into the input vector register (223) to generate the output vector in the output vector register (229).

When the memristor crossbar array (221) is reduced to one bitline, the matrix in the memristor crossbar array (221) is reduced to a vector. Thus, the calculation of the multiply-accumulate unite (220) is reduced to the multiplication of an input vector stored in the input vector register (223) and the vector stored in the memristor crossbar array (221). Such an embodiment can be used to implement the vector-vector units (161, . . . , 163) in the matrix-vector unit (141) of FIG. 3 and/or the multiply-accumulate units (171, . . . , 173) in FIG. 6.

In some embodiments, at least a portion of the random access memory (105) is implemented using memristors; and some of the matrices (207) of the Artificial Neural Networks are stored in memristor crossbar arrays (e.g., 221) in the random access memory (105). Thus, the matrix computations involving such matrices can be performed directly via the multiply-accumulate calculations performed in reading the matrix using input voltages (225) that correspond to an input vector stored in an input vector register (223). Further calculations can be performed in additional processing units (111) in the Deep Learning Accelerators (103).

Optionally, at least a portion of the random access memory (105) is organized in tiles. Each tile is in the form of a multiply-accumulate unit (220), having a memristor crossbar array (221) configured to store a matrix. The output vector generated in the output vector register can be stored into the memristor crossbar array (221) of another tile as part of a vector in an intermediate matrix, or stored into the input vector register of another tile.

Figure 7:
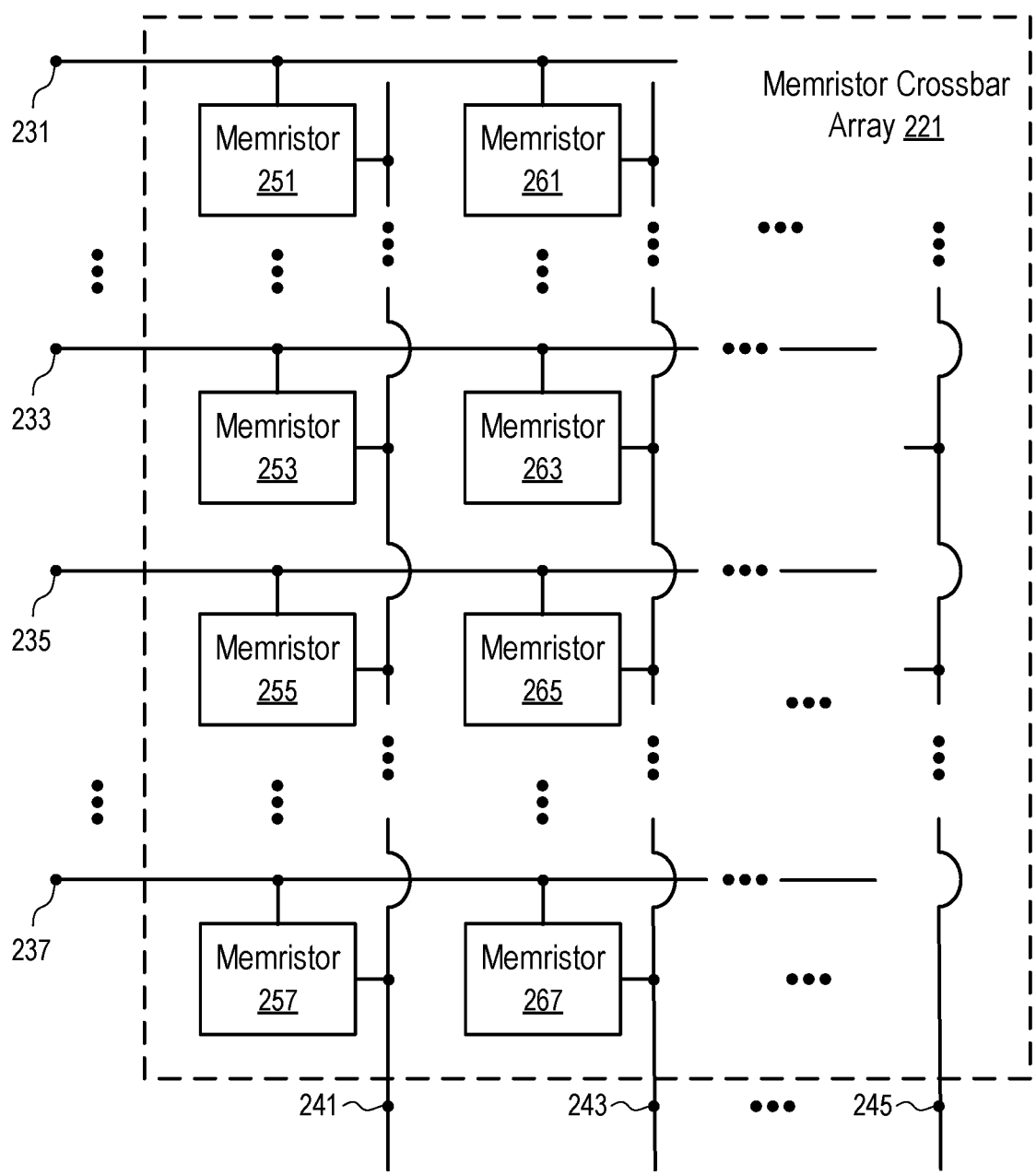
FIG. 7 shows multiply-accumulate operations in a memristor crossbar array according to one embodiment.

FIG. 7 shows multiply-accumulate operations in a memristor crossbar array according to one embodiment. For example, the memristor crossbar array (221) of FIG. 6 can be implemented in a way as illustrated in FIG. 7.

In FIG. 7, each of the memristors in the crossbar array (221) is connected between a wordline (e.g., 231) and a bitline (e.g., 241). The wordlines (231, . . . , 233, 235, ..., 237) are configured to receive input voltages (225); the bitlines (241, 243, ..., 245) are configured to provide output currents (227).

For example, when a voltage is applied on the wordline (231), the voltage generates currents flowing to the bitlines (241, 243, ..., 245) through the memristors (251, 261, ...) respectively. The contributions from the voltage applied on the wordline (231) to the currents in the bitlines (241, 243, ..., 245) are proportional to weights and responses of memristors (251, 261, ...,) to the input voltage applied on the wordline (231). The weights and responses of memristors (251, 261, ...,) can be implemented via programming the resistances of the memristors (251, 261, ...) respectively.

The bitlines (241, 243, ..., 245) sum the electric currents contributed from the input voltages (225) applied on the wordlines (231, ..., 233, 235, ..., 237) to the bitlines (241, 243, ..., 245). Thus, the currents in the bitlines (241, 243, ..., 245) correspond to the summation of the multiplications of the weights of memristors, with the input voltages (225) of the wordlines (231, ..., 233, 235, ..., 237).

For example, the contributions of the voltages on the wordlines (231, ..., 233, 235, ..., 237) to the bitline (241) are summed via the currents flowing from the wordlines (231, ..., 233, 235, ..., 237) through the memristors (251, ..., 253, 255, ..., 257) to the bitline (241); and the contributions of the voltages on the wordlines (231, ..., 233, 235, ..., 237) to the bitline (243) are summed via the currents flowing from the wordlines (231, ..., 233, 235, ..., 237) through the memristors (261, ..., 263, 265, ..., 267) to the bitline (243); etc.

Thus, the crossbar array (221) performs multiply-accumulate operations by converting the input voltages (225) on the wordlines (231, ..., 233, 235, ..., 237) to the output currents (227) on bitlines (241, 243, ..., 245).

The resistance values of the memristors in the crossbar array (221) can be changed via programming the memristors through selectively applying currents and/or voltages. For example, after a memristor (e.g., 251) is selected for programming, a voltage applied on the memristor (e.g., 251) can be raised to place the memristor (e.g., 251) in a switch-on state; and then programming pulses can be applied on the memristor (e.g., 251) to adjust the resistance of the memristor (e.g., 251) to a desired value. After the programming, the memristor (e.g., 251) remembers its programmed resistance during its switch-off state, until the memristor (e.g., 251) is again selected for programming under the switch-on state. A separate circuit can be used to select memristor (e.g., 251) and program the resistance of the memristor (e.g., 251). The wordlines and bitlines can be used to apply voltages to select memristors for programming, reading, and/or performing multiply-accumulate operations.

Figure 8:
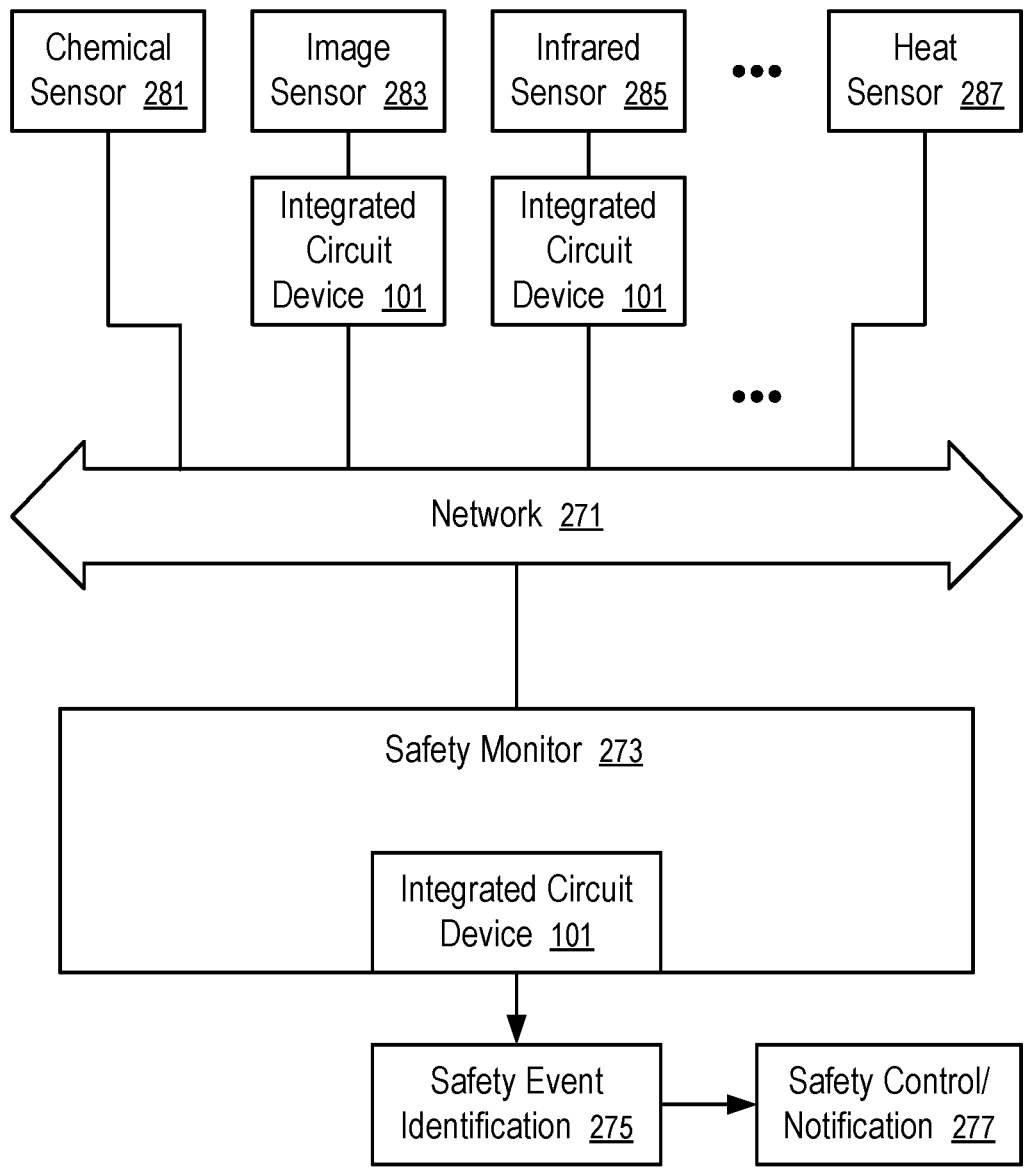
FIG. 8 shows a factory safety monitoring system according to one embodiment.

FIG. 8 shows a factory safety monitoring system according to one embodiment.

In FIG. 8, the system uses various sensors to collect information about the operating states, conditions and/or and statuses of production lines and/or machines. The sensors can include a chemical sensor (281), an image sensor (283), an infrared sensor (285), a heat sensor (287), etc. FIG. 8 shows the set of particular sensors as illustrative examples of possible sensors. Other combinations of sensors and additional types of sensors (e.g., stress sensors, pressure sensors, audio sensors, etc.) can also be used.

The data generated by the sensors installed in the factory can be analyzed using an Artificial Neural Network (201) to generate a safety event identification (275) by a centralized safety monitor (273).

At least some of the sensors (e.g., image sensor (283) and infrared sensor (285)) can have integrated circuit devices (101) configured to store and/or buffer their sensor data in their random access memory (105), and to preprocess their sensor data to identify features and/or patterns that can be further analyzed by the safety monitor (273). The integrated circuit devices (101) can be further configured to perform portions of the matrix computations of the Artificial Neural Network (201).

The safety monitor (273) can have one or more integrated circuit devices (101) configured to perform a portion of the matrix computations of the Artificial Neural Network (201).

Based on the data generated by the sensors (e.g., 281, 283, 285, ..., 287), the Artificial Neural Network (201) can generate a safety event identification (275), such as whether the factory is operating in a safe mode, whether the hazardous condition (or a potential hazard) is detected in the factory and if so, the location, scope and type of the hazard and/or recommended operations to avoid, limit, or reduce damage, disruption, and/or harm. Optionally, the safety event identification (275) can include the identification of an abnormal pattern in sensor data and a portion of the factory that is responsible for the anomaly.

For example, based on the safety event identification (275), an operator of the factory can active safety controls (277) (and/or notifications). In some instances, the safety event identification (275) can cause emergency actions to stop certain operations and start other operations to prevent accident, fire, damage, etc. The safety event identification (275) can assist a human operator in assessing the condition and taking appropriate safety measure. In some instances, the safety event identification (275) can automatically trigger safety responses to minimize damage and/or harm.

The matrix computations of the Artificial Neural Network (ANN) (201) can be distributed among the integrated circuit devices (101) connected locally to at least some of the sensors and to the safety monitor (273). The sensor data is fused in the Artificial Neural Network (ANN) (201) to generate the safety event identification (275).

In some instances, the data from multiple sensors (e.g., 281, 283 and/or 285) in a cluster can be stored/buffered into a shared integrated circuit device (101). Since memristors can be used as non-volatile memory cells, the integrated circuit device (101) can function as a storage device to store the sensor data for a most recent period of time after the generation of the output (213) of the Artificial Neural Network (ANN) (201). The intermediate results of the Artificial Neural Network (ANN) (201) generated at the integrated circuit device (101) can be transmitted over a computer network (271) to the safety monitor (273) for further analyses.

In some instances, the data from a sensor (e.g., 281 or 287) can be provided to multiple integrated circuit devices (101) for combination with other sensor data in their analyses to generate intermediate results. Thus, the matrix computations of the Artificial Neural Network (ANN) (201) can be interleaved in the integrated circuit devices (101) configured in the system.

The integrated circuit devices (101) configured in the safety monitoring system of FIG. 8 can be implemented in a way as illustrated in FIG. 1 without processing units (111) implemented according to FIGS. 2, 3, 4 and/or 6.

The integrated circuit devices (101) configured in the safety monitoring system of FIG. 8 can be connected to the sensors (281, 283, 285, . . . , 287) via a wired and/or wireless computer network (271), memory buses, and/or computer peripheral buses. When a memristor crossbar array (221) is used to implement a multiply-accumulate unit (220) of an integrated circuit device (101), neuromorphic computing can be performed in-memory within the integrated circuit device (101) with reduce energy consumption and/or increased computing speed.

Optionally, unsupervised machine learning can be implemented via the memristor crossbar array (221) to train the respective portions of the Artificial Neural Network (201) in identify patterns and thus improve their outputs over time.

The integrated circuit devices (101) can be configured with memory/storage capacity to buffer/store sensor data for a period of time (e.g., 30 seconds, a few minutes or hours). The newest sensor data can be written over the oldest sensor data in a cyclic way. Thus, when needed, the input data within the period of time can be retrieved for further analysis. For example, after an incident in the factory, the stored sensor data can be retrieved to investigate the cause of the incident.

Figure 9:
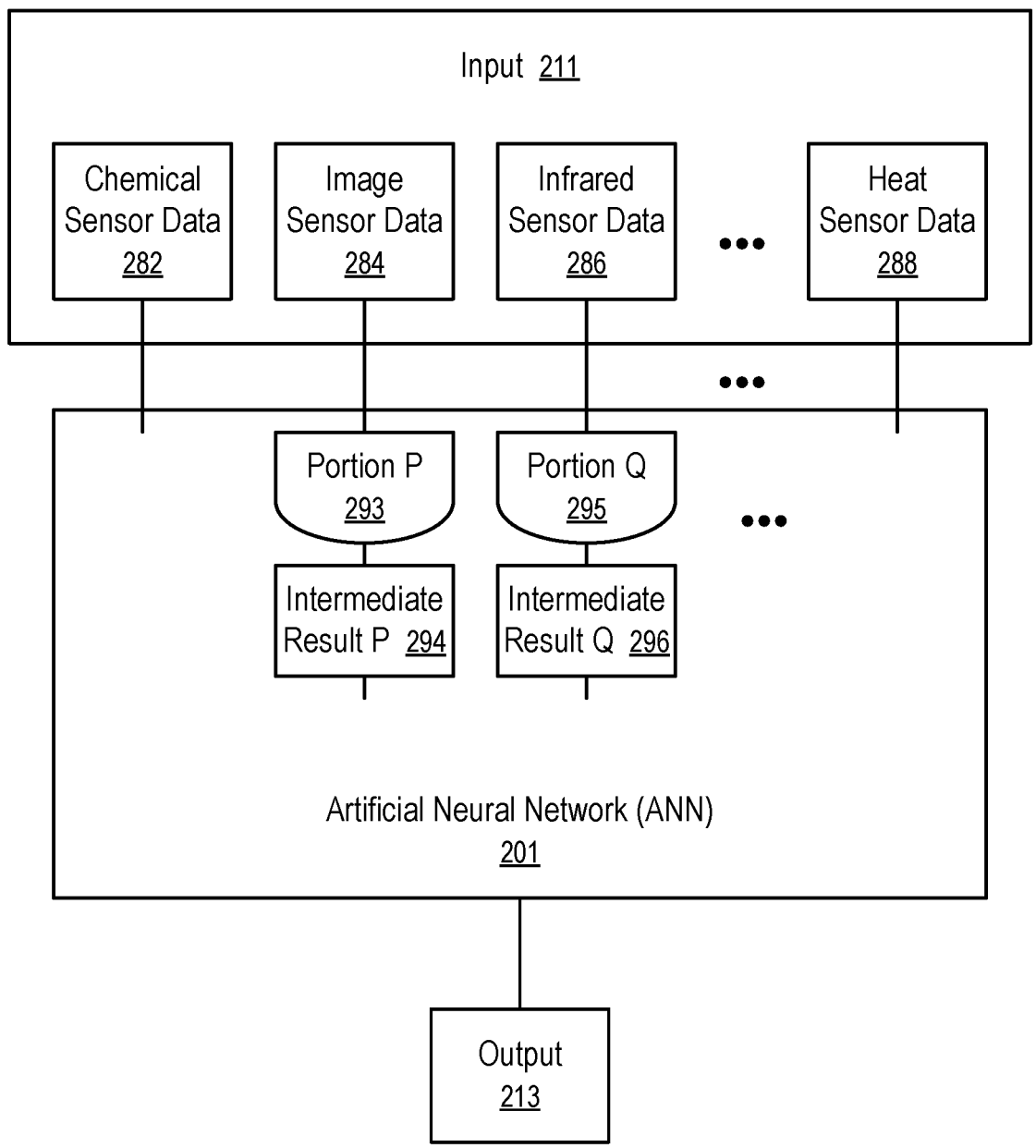
FIG. 9 illustrates the partitioning of an Artificial Neural Network for distributed processing in a factory safety monitoring system according to one embodiment.

FIG. 9 illustrates the partitioning of an Artificial Neural Network for distributed processing in a factory safety monitoring system according to one embodiment. For example, the partitioning of an Artificial Neural Network (201) as illustrated in FIG. 9 can be used to distribute the matrix computation of the Artificial Neural Network (201) to the integrated circuit devices (101) in the factory safety monitoring system of FIG. 8.

In FIG. 9, the Artificial Neural Network (201) generates an output (213) responsive to an input (211). The input (211) includes the sensor data generated by the sensors (e.g., 281, 283, 285, . . . , 287) configured in a factory safety monitoring system (e.g., as illustrated in FIG. 8). For example, the input (211) can include chemical sensor data (282) generated by a chemical sensor (281), image sensor data (284) generated by an image sensor (283), infrared sensor data (286) generated by an infrared sensor (285), heat sensor data (288) generated by a heat sensor (288).

In general, a factory safety monitoring system as in FIG. 8 can have multiple sensors of a same type that are installed in different locations in the factory. For example, multiple image sensors can be configured at different locations of a production line and/or near multiple machines respectively. Thus, the input (211) can have multiple sets of image sensor data corresponding to the multiple image sensors.

The sensor data from one or more sensors can be analyzed in a portion of the Artificial Neural Network (201) to generate an intermediate result. The intermediate result is the output of the portion of the Artificial Neural Network (201) and the input to a remaining portion of the Artificial Neural Network (201).

For example, the image sensor data (284) can be analyzed by a portion (293) to generate an intermediate result (294) that is the input to the remaining portion of the Artificial Neural Network (201). The computation of the portion (293) can be implemented in an integrated circuit device (101) configured as the storage device of an image sensor (283) that generates the image sensor data (284); and the remaining portion of the image sensor data (284) can be implemented in the safety monitor (273). The intermediate result (294) can be transmitted from the integrated circuit device (101) of the image sensor (283) to the integrated circuit device (101) of the safety monitor (273) as the input to the portion implemented in the safety monitor (273).

Similarly, the infrared sensor data (286) can be analyzed by a corresponding portion (295) to generate a corresponding intermediate result (296) as an input for the remaining portion of the Artificial Neural Network (201) implemented in the safety monitor (273).

In some implementations, the portions (e.g., 293 and 295) configured for the local processing at respective sensors (e.g., image sensor (283) and infrared sensor (285)) can partially overlap with each other in the Artificial Neural Network (201).

For example, one portion (e.g., 293) can be used to process the combined input from the chemical sensor data (282) and the image sensor data (284); and another portion (e.g., 295) can be used to process the combined input from the chemical sensor data (282) and the infrared sensor data (286). Thus, the portions (e.g., 293 and 295) overlap with each other in part in the Artificial Neural Network (201). For example, the chemical sensor (281) can broadcast its data to the integrated circuit devices (101) of the image sensor (283) and the infrared sensor (285) for the processing of the portions (e.g., 293 and 295) respectively.

Figure 10:
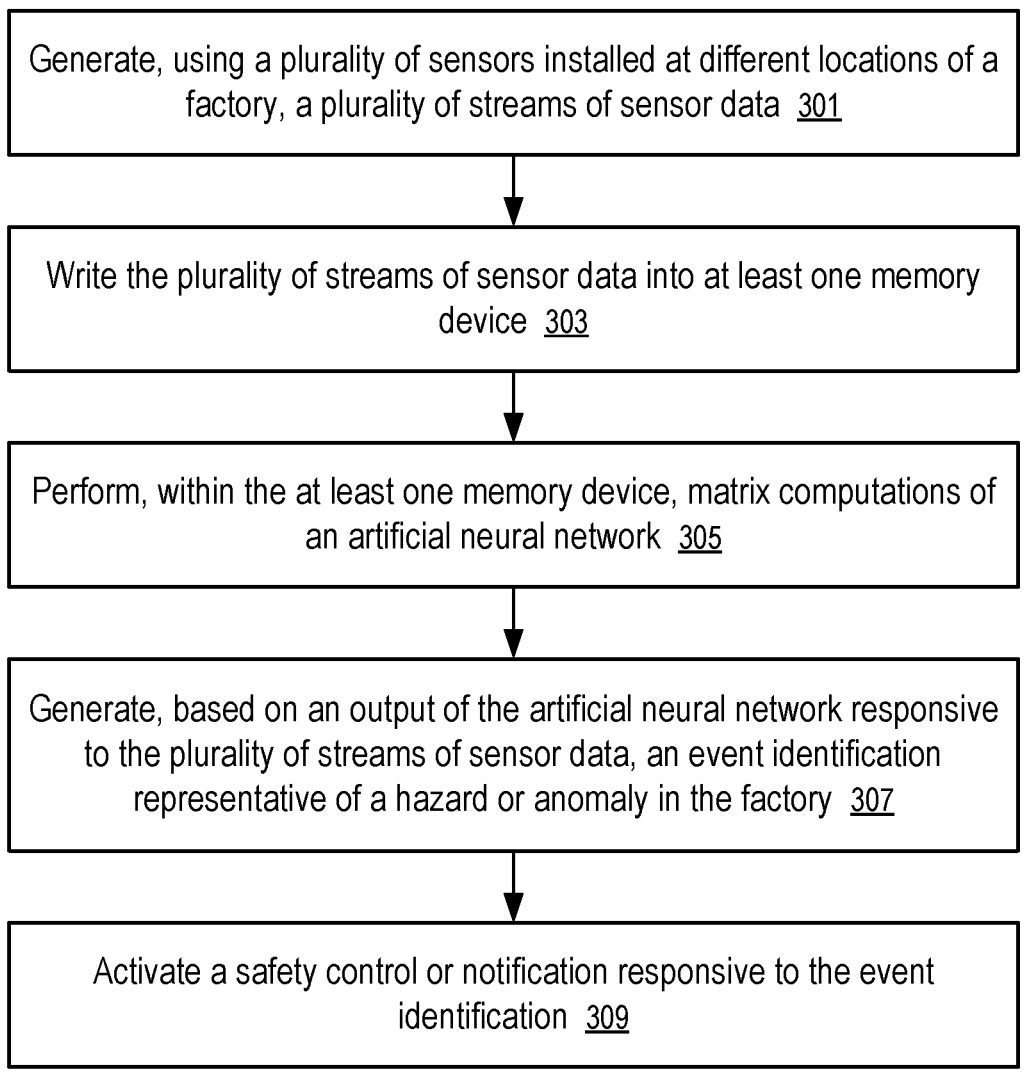
FIG. 10 shows a method implemented in a factory safety monitoring system according to one embodiment.

FIG. 10 shows a method implemented in a factory safety monitoring system according to one embodiment. For example, the method of FIG. 10 can be implemented in a system of FIG. 8 using integrated circuit devices (101) of FIG. 1 with processing units illustrated in FIGS. 2, 3, 4 and/or 6.

At block 301, the system uses a plurality of sensors installed at different locations of a factory to generate a plurality of streams of sensor data.

For example, the plurality of sensors can include a chemical sensor (281), an image sensor (283), an infrared sensor (285), a heat sensor (287), and/or other sensors, such as a microphone, a stress sensor, a strain sensor, a position sensor, etc.

At block 303, the system writes the plurality of streams of sensor data into at least one memory device.

For example, each of the memory devices configured in the system can be implemented using an integrated circuit device (101) of FIG. 1. Some of the integrated circuit devices (101) can be co-located with some of the sensors installed in the factory; and some of the integrated circuit devices (101) can be configured in one or more computing devices that are away from the sensor locations. For example, a safety monitor (273) can be a computing device connected, via a wired and/or wireless computer network (271), to sensor devices installed at various locations in the factory. Some of the sensor devices can have an integrated circuit device (101); and some of the sensor devices may not have an integrated circuit device (101). In some implementations, multiple sensors may share a memory device. Optionally, multiple sensors and a memory device can be bundled as a sensor device installed at one location in the factory.

At block 305, the at least one memory device performs matrix computations of an artificial neural network (201).

For example, a memory device implemented using an integrated circuit device of FIG. 1 can include a random access memory (105) having at least one multiply-accumulate unit (220).

For example, the multiply-accumulate unit (220) can store data representative of a matrix of the artificial neural network (201) and configured to perform an multiply-accumulate operation involving the matrix.

For example, the multiply-accumulate unit (220) can include a crossbar array (221) of memristors connected between wordlines (231 to 237) and bitlines (241 to 245).

The memristors in the crossbar array (221) can be configured to store data representative of one of matrices (207) of the artificial neural network (201).

Further, the multiply-accumulate unit (220) can include: a set of digital to analog converters (224) to generate input voltages (225) applied on the wordlines (231 to 237) according to an input vector; a set of analog to digital converters (228) to generate, from output currents (227) in the bitlines (241 to 245), an output vector representative of a multiplication of the matrix with the input vector; an input vector register (223) configured to store data representative of the input vector during the multiply-accumulate operation; and an output vector register (229) configured to store data representative of the output vector after the multiply-accumulate operation.

For example, the memory device (e.g., an integrated circuit device (101) of FIG. 1) can include a control unit (113) configured to load instructions (205) from the random access memory (105) for execution to generate the intermediate result.

At block 307, based on an output of the artificial neural network (201) responsive to the plurality of streams of sensor data, the system generates an event identification (275) representative of a hazard or anomaly in the factory.

For example, first memory devices co-located with the sensors can generate intermediate results (e.g., 294, 296) that are transmitted via a wired and/or wireless computer network (271) to a computing device (e.g., safety monitor (273)) that has one or more second memory devices configured to generate the output (213) of the artificial neural network (201) from the intermediate results (e.g., 294, 296) and/or other sensor data (e.g., chemical sensor data (282), heat sensor data (288)).

For example, an image sensor (283) can write its image sensor data into its memory device, which generating an intermediate result (294) according to a portion (293) the artificial neural network (201) implemented in the memory device. A sensor device having the image sensor (283) and the memory device can transmit, via a wired or wireless connection, the intermediate result (294) to a computing device (e.g., safety monitor (273)) to generate the output (213) of the artificial neural network (201).

Optionally, a further sensor (e.g., a chemical sensor (281), a heat sensor (287), an infrared sensor (285)) different from the image sensor (283) can also write its sensor data into the memory device of the image sensor (283). Thus, sensor data from multiple sensors can be combined and/or fused in the memory device of the image sensor (283) to generate an intermediate result (294).

At block 309, the system activates a safety control (277) or notification responsive to the event identification (275).

The memory devices can be non-volatile and configured to store the sensor data (e.g., 282, 284, 286, . . . , 288) at least for a predetermined period of time (e.g., 30 seconds, a few minutes or hours) after the generating of the output (213) of the artificial neural network (201). The stored data can be used to investigate the cause of the hazard or anomaly in the factory.

Figure 11:
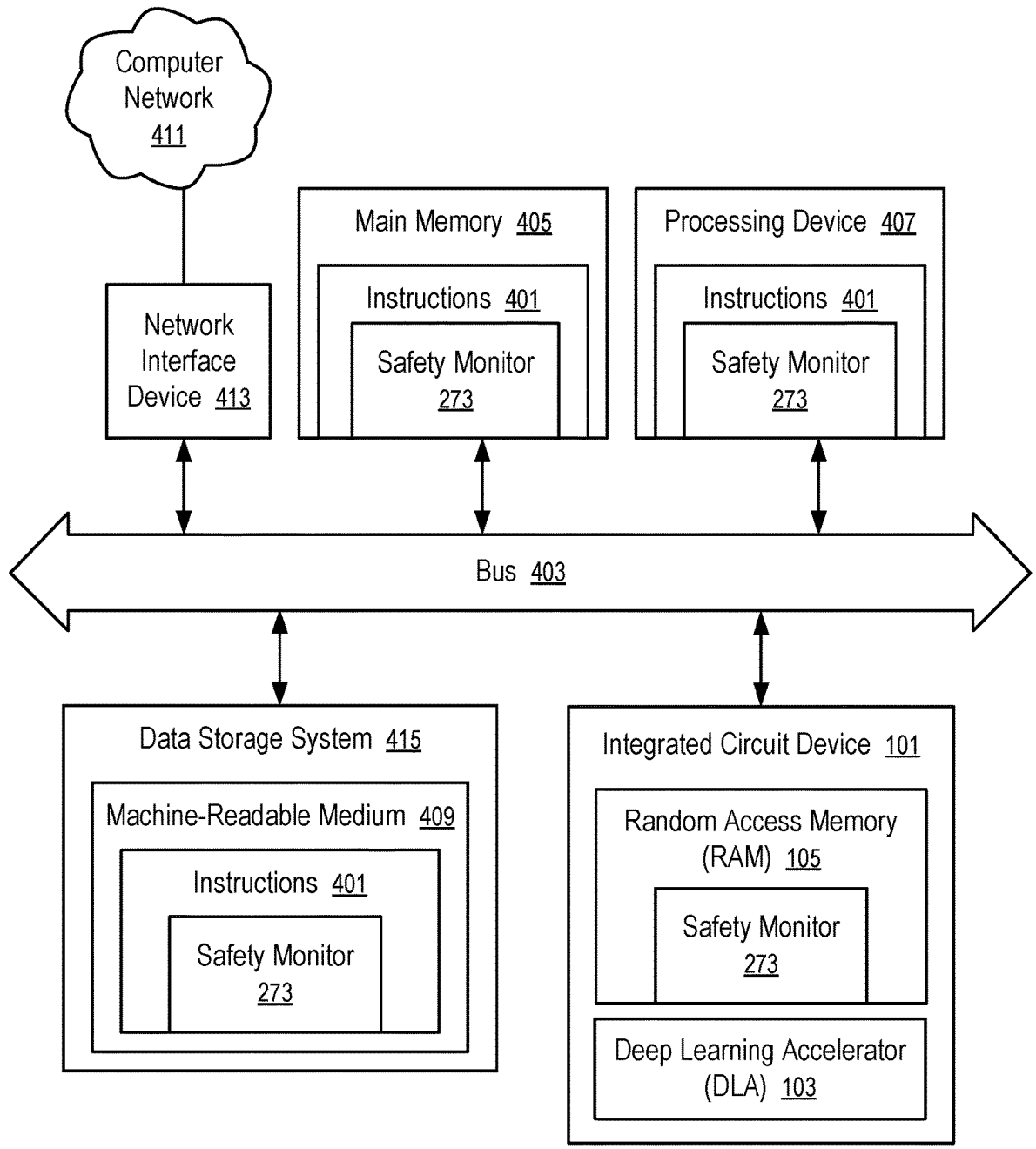
FIG. 11 a block diagram of an example computer system in which embodiments of the present disclosure can operate.

FIG. 11 illustrates an example machine of a computer system within which a set of instructions, for causing the machine to perform any one or more of the methodologies discussed herein, can be executed. For example, the methodologies discussed in connection with FIG. 11 can be implemented via the set of instruction.

In some embodiments, the computer system of FIG. 11 can implement a system of FIG. 8 with a safety monitor (273) configured to perform the operations discussed in connection with FIGS. 8 to 10.

The computer system of FIG. 11 can be used to perform the operations of a safety monitor (273) described with reference to FIGS. 8-10 by executing instructions configured to perform the operations corresponding to the safety monitor (273).

In some embodiments, the machine can be connected (e.g., networked) to other machines in a Local Area Network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

For example, the machine can be configured as a personal computer (PC), a tablet PC, a set-top box (STB), a Personal Digital Assistant (PDA), a cellular telephone, a surveillance camera, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system illustrated in FIG. 11 includes a processing device (407), a main memory (405), and a data storage system (415), which communicate with each other via a bus (403). For example, the processing device (407) can include one or more microprocessors; the main memory (405) can include read-only memory (ROM), flash memory, dynamic random access memory (DRAM), such as synchronous DRAM (SDRAM) or Rambus DRAM (RDRAM), static random access memory (SRAM), etc. The bus (403) can include, or be replaced with, multiple buses.

The processing device (407) in FIG. 11 can include one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Alternatively, or in combination, the processing device (407) can include one or more special-purpose processing devices such as an application specific integrated circuit (ASIC), a field programmable gate array (FPGA), a digital signal processor (DSP), a network processor, or the like. The processing device (407) is configured to execute instructions (401) for performing the operations discussed in connection with the safety monitor (273).

The example computer system illustrated in FIG. 11 can include an integrated circuit device (101) having a random access memory (105) and a deep learning accelerator (103). The random access memory (105) and a deep learning accelerator (103) can have one or more multiply-accumulate unit (220) configured to perform in-memory calculation, as in FIGS. 6 and 7.

The computer system of FIG. 11 can further include a network interface device (413) to communicate over a computer network (411).

The data storage system (415) can include a machine-readable medium (409) (also known as a computer-readable medium) on which is stored one or more sets of instructions (401) or software embodying any one or more of the methodologies or functions described herein. The instructions (401) can also reside, completely or at least partially, within the main memory (405) and/or within the processing device (407) during execution thereof by the computer system, the main memory (405) and the processing device (407) also constituting machine-readable storage media.

In one embodiment, the instructions (401) include instructions to implement functionality corresponding to a safety monitor (273), such as the safety monitor (273) described with reference to FIGS. 8-10. While the machine-readable medium (409) is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

The present disclosure includes methods and apparatuses which perform the methods described above, including data processing systems which perform these methods, and computer readable media containing instructions which when executed on data processing systems cause the systems to perform these methods.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
   generating, using a plurality of sensors installed at different locations of a manufacturing facility, a plurality of streams of sensor data;
   writing the plurality of streams of sensor data into at least one memory device;
   performing, within the at least one memory device, matrix computations of an artificial neural network;
   generating, based on an output of the artificial neural network responsive to the plurality of streams of sensor data, an event identification representative of a hazard or anomaly in the manufacturing facility, and activating a safety control or notification responsive to the event identification;
   wherein each of the at least one memory device includes at least one multiply-accumulate unit having a memristor crossbar array configured to store data representative of a matrix of the artificial neural network and configured to perform an multiply-accumulate operation with the matrix;
   wherein the multiply-accumulate unit further includes a set of digital to analog converters to convert an input vector into input voltages applied on wordlines of the memristor crossbar array.

2. The method of claim 1, wherein the method further comprises:
   writing image data generated by the image sensor into the first memory device;
   generating an intermediate result of the artificial neural network in the first memory device; and
   transmitting, via a wired or wireless connection, the intermediate result to a computing device to generate the output of the artificial neural network.

3. The method of claim 2, wherein the method further comprises:
   writing the intermediate result into a second memory device configured in the computing device to generate the output of the artificial neural network.

4. The method of claim 2, wherein the plurality of sensor includes a further sensor different from the image sensor; and the method further comprises:
   writing sensor data generated by the further sensor into the first memory device, wherein the intermediate result is based on at least the image data generated by the image sensor and the sensor data generated by the further sensor.

5. The method of claim 4, wherein the sensor data generated by the further sensor includes a stream of image data.

6. The method of claim 2, wherein the plurality of sensor includes a further sensor different from the image sensor; and the method further comprises:
   transmitting, via a wired or wireless connection, sensor data generated by the further sensor to the computing device to generate the output of the artificial neural network.

7. The method of claim 2, the plurality of sensor includes a further sensor different from the image sensor; and the method further comprises:
   broadcasting, via a wired or wireless connection to a computer network, sensor data generated by the further sensor to write the sensor data into a plurality of memory devices including the first memory device;
   generating, within the plurality of memory devices, a plurality of intermediate results; and
   transmitting, via the computer network, the plurality of intermediate results to the computing device to generate the output of the artificial neural network.

8. The method of claim 7, further comprising:
   storing the plurality of streams of sensor data in the plurality of memory devices at least for a predetermined period of time after the output of the artificial neural network is generated.

9. A system, comprising:
   a plurality of sensors installed at different locations of a manufacturing facility and configured to generate a plurality of streams of sensor data;
   at least one memory device coupled with the plurality of sensors, the plurality of sensors further configured to write the plurality of streams of sensor data into the at least one memory device, and the at least one memory device configured to perform matrix computations of an artificial neural network; and
   a computing device configured to generate, based on an output of the artificial neural network responsive to the plurality of streams of sensor data, an event identification representative of a hazard or anomaly in the manufacturing facility, the computing device further configured to activate a safety control or notification responsive to the event identification;
   wherein each of the at least one memory device includes at least one multiply-accumulate unit having a memristor crossbar array configured to store data representative of a matrix of the artificial neural network and configured to perform an multiply-accumulate operation with the matrix;

wherein the multiply-accumulate unit further includes a set of digital to analog converters to convert an input vector into input voltages applied on wordlines of the memristor crossbar array.

10. The system of claim 9, wherein the multiply-accumulate unit further includes a set of analog to digital converters to convert currents in bitlines of the memristor crossbar array into an output vector.

11. The system of claim 10, wherein the multiply-accumulate unit further includes:
 an input vector register configured to store the input vector; and
 an output vector register configured to store the output vector representative of a multiplication of the matrix with the input vector.

12. The system of claim 10, wherein each of the at least one memory device includes a Field-Programmable Gate Array (FPGA) or Application Specific Integrated circuit (ASIC) configured to execute instructions to implement matrix computations of the artificial neural network.

13. The system of claim 12, wherein the at least one memory device includes
 a plurality of first memory devices co-located with a plurality of first sensors in the manufacturing facility and configured to generate a plurality of intermediate results of the artificial neural network; and
 at least one second memory device configured in the computing device to receive intermediate results to generate the output of the artificial neural network.

14. A sensor device, comprising:
 a sensor configured to generate a stream of sensor data at a location of a factory; and
 a memory device coupled with the sensor, the sensor configured to write the stream of sensor data into the memory device, the memory device configured to perform matrix computations of an artificial neural network to generate an intermediate result; and wherein the sensor device is configured to transmit, via a wired or wireless communications connection, the intermediate result to a computing device, the computing device configured to generate, based on an output of the artificial neural network responsive to a plurality of streams of sensor data generated in the factory, an event identification representative of a hazard or anomaly in the factory;

wherein the memory device comprises a random access memory having at least one multiply-accumulate unit configured to store data representative of a matrix of the artificial neural network and configured to perform an multiply-accumulate operation involving the matrix;

wherein the multiply-accumulate unit comprises;
 a crossbar array of memristors connected between wordlines and bitlines;
 a set of digital to analog converters to generate input voltages applied on the wordlines according to an input vector;
 a set of analog to digital converters to generate, from currents in the bitlines, an output vector representative of a multiplication of the matrix with the input vector;
 an input vector register configured to store data representative of the input vector during the multiply-accumulate operation; and
 an output vector register configured to store data representative of the output vector after the multiply-accumulate operation.

15. The sensor device of claim 14, wherein the memristors are configured to store the data representative of the matrix of the artificial neural network.

16. The sensor device of claim 14, wherein the memory device further comprises:
 a control unit configured to load instructions from the random access memory for execution to generate the intermediate result.

* * * * *